May 16, 1933.   C. N. HELLER   1,909,675
NEWSPAPER HOLDER
Filed June 4, 1931
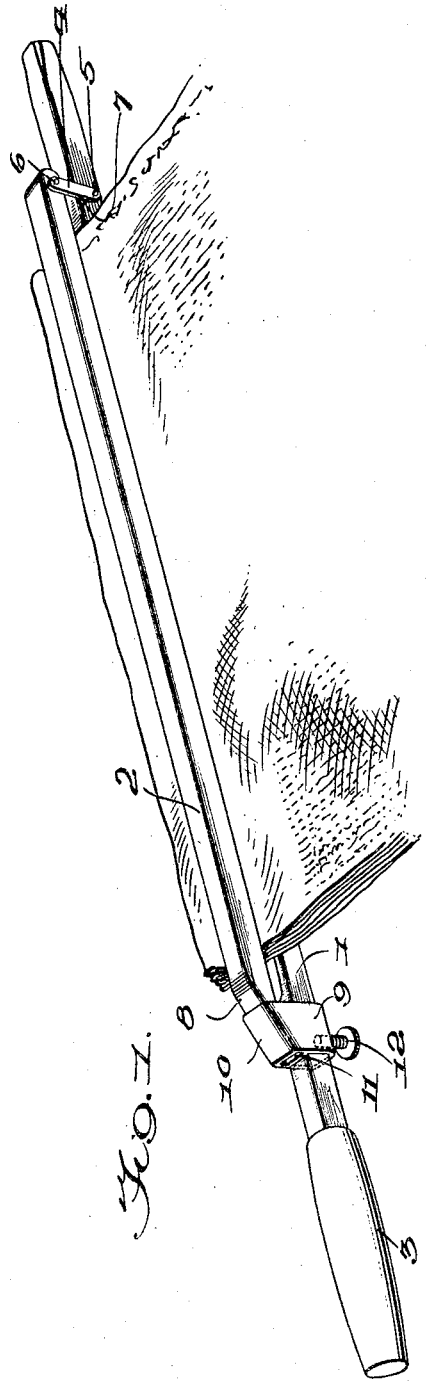
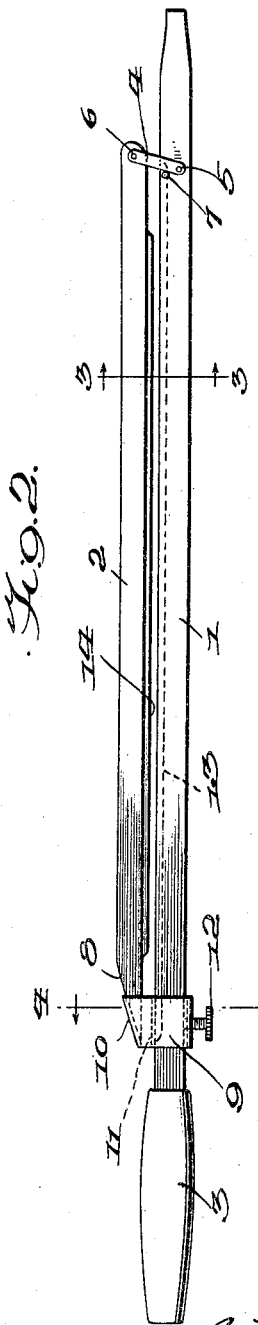
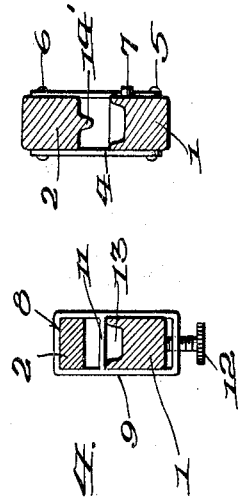
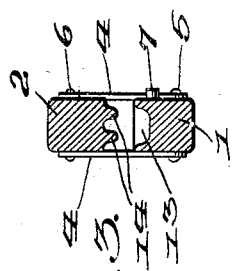
Inventor
C. Nivin Heller
By Vernon E. Hodges
his Attorney Patented May 16, 1933

1,909,675

UNITED STATES PATENT OFFICE

CLARENCE NEVIN HELLER, OF LANCASTER, PENNSYLVANIA

NEWSPAPER HOLDER

Application filed June 4, 1931. Serial No. 542,178.

This invention relates to an improvement in newspaper holders.

The object of the invention is to provide a holder for newspapers so as to bind and hold the newspapers securely with an equal pressure along the entire length of the paper.

This is accomplished by the use of parallel clamping bars connected together by links at one end only, while the opposite ends are provided with a clamp to clamp them together, and which cooperate with the links to maintain the clamping bars in all adjusted positions.

In the accompanying drawing:

Fig. 1 is a perspective view of the holder with papers in place therein;

Fig. 2 is a side elevation thereof;

Fig. 3 is a transverse sectional view on the line 3—3 of Fig. 2;

Fig. 4 is a transverse sectional view on the line 4—4 of Fig. 2; and

Fig. 5 is a view similar to Fig. 3 showing a slight modification in the rib between the bars.

The clamping bars are designated generally by the numerals 1 and 2, and the bar 1 is provided with a handle 3 at one end thereof. The clamping bars 1 and 2 are pivotally connected together by means of a pair of links 4, pivoted as at 5 and 6, respectively, with both of the clamping bars 1 and 2 at one end of each thereof, so as to hold the bars in slightly spaced relation, as shown in Figs. 2 and 3.

The bar 2 may swing on the links toward and from the bar 1 when adjusted. A pin 7 serves to limit the swinging movement of the links 4 in one direction.

The bar 2, at its opposite end, has a bevelled portion 8. A clamp 9 is slidably mounted on the bar 1 and has an inclined portion 10 for engaging the bevelled end 8 of the bar 2 as the clamp 9 slides lengthwise of the bar 1. A partition 11 may be arranged transversely of the clamp 9 to brace the same. A set-screw 12 is threaded into the under side of the clamp 9 to engage the lower edge of the bar 1 for locking the clamp in adjusted position and to permit lengthwise adjustment thereof relative to the bar 1.

The inclined portion 10 of the clamp, engaging the bevelled edge 8 of the bar 2, cooperates with the links 4 which pivotally connect the opposite ends of the bars together to maintain the bars in all adjusted positions thereof, so as to bind and hold the papers securely, but with equal pressure along the entire length of the holder, while at the same time providing for adjustment of the space between the parallel bars.

To facilitate the holding of the papers between the bars and prevent their accidental removal, the clamping bar 1 is provided with a longitudinal groove 13 therein, while the bar 2 is shown in Fig. 3 as having two ribs 14 on the inner side thereof, for cooperating with the groove 13 to hold the papers in place therebetween.

If desired, only a single rib may be used, as shown in Fig. 5, instead of two as shown in Fig. 3, which single rib is designated 14' in Fig. 5.

In applying the papers, the clamp 9 is loosened and is slid back on the bar 1 to release the end of the bar 2, which may be raised to receive the papers, after which it is brought down in parallel relation with the bar 1, the links 4 swinging on their pivots to permit of such parallel relation, and the clamp 9 is then moved over the end of the bar 2 with its inclined portion 10 engaging the bevelled end 8 to tighten the clamping bars on the papers, and the screw 12 may then be turned to securely hold the clamp in place.

The space between the clamping bars 1 and 2 is adjustable, while affording equal pressure along the entire length of the holder, due to the pivoted links at one end and the adjustable clamp at the other, which engages the bevelled end of one of the bars.

I claim:

1. A newspaper holder comprising clamping bars, at least one bar having a beveled portion, a link pivotally connected with end portions of both of the bars at adjacent ends thereof, adjustable clamping means connecting adjacent end portions of the bars together at the opposite end of each from the link, and having a portion thereof bearing against the beveled portion of the bar and cooperating with the link for holding the bars in adjusted positions.

2. A newspaper holder comprising clamping bars, one or more links pivotally connected with and between end portions of both of the bars at adjacent ends thereof, one of the bars having a bevelled portion at the opposite end thereof from the link, a clamp connected with the other bar and having an inclined portion for engaging the bevelled portion of the first mentioned bar to hold the bars in adjusted positions, and locking means for the clamp.

3. A newspaper holder comprising clamping bars, a pair of links pivotally connected with end portions of the bars at adjacent ends thereof, one of the bars having the opposite end thereof bevelled, and clamping means connected with the other bar and constructed and arranged for engaging the bevelled end for cooperating with the links to keep the bars in adjusted positions.

4. A newspaper holder comprising clamping bars, one of said bars having a groove therein, the other bar having one or more ribs cooperating with the groove for holding papers between the bars, a pair of links pivotally connected with adjacent ends of both of the bars and arranged therebetween to connect said ends of the bars together, one of the bars having the outer side of the opposite end thereof bevelled, and a clamp slidably mounted on the other bar and having an inclined portion for engaging the bevelled end of said bar.

5. A newspaper holder comprising clamping bars, one of said bars having a groove therein, the other bar having one or more ribs cooperating with the groove for holding papers between the bars, a pair of links pivotally connected with and between adjacent ends of both of the bars and arranged therebetween to connect said ends of the bars together, one of the bars having the outer side of the opposite end thereof bevelled, a clamp slidably mounted on the other bar and having an inclined portion for engaging the bevelled end of said bar, to hold the bars in adjusted positions and cooperating with the links, locking means for the clamp, and a handle connected with one of the bars.

In testimony whereof I affix my signature.

CLARENCE NEVIN HELLER.